UNITED STATES PATENT OFFICE.

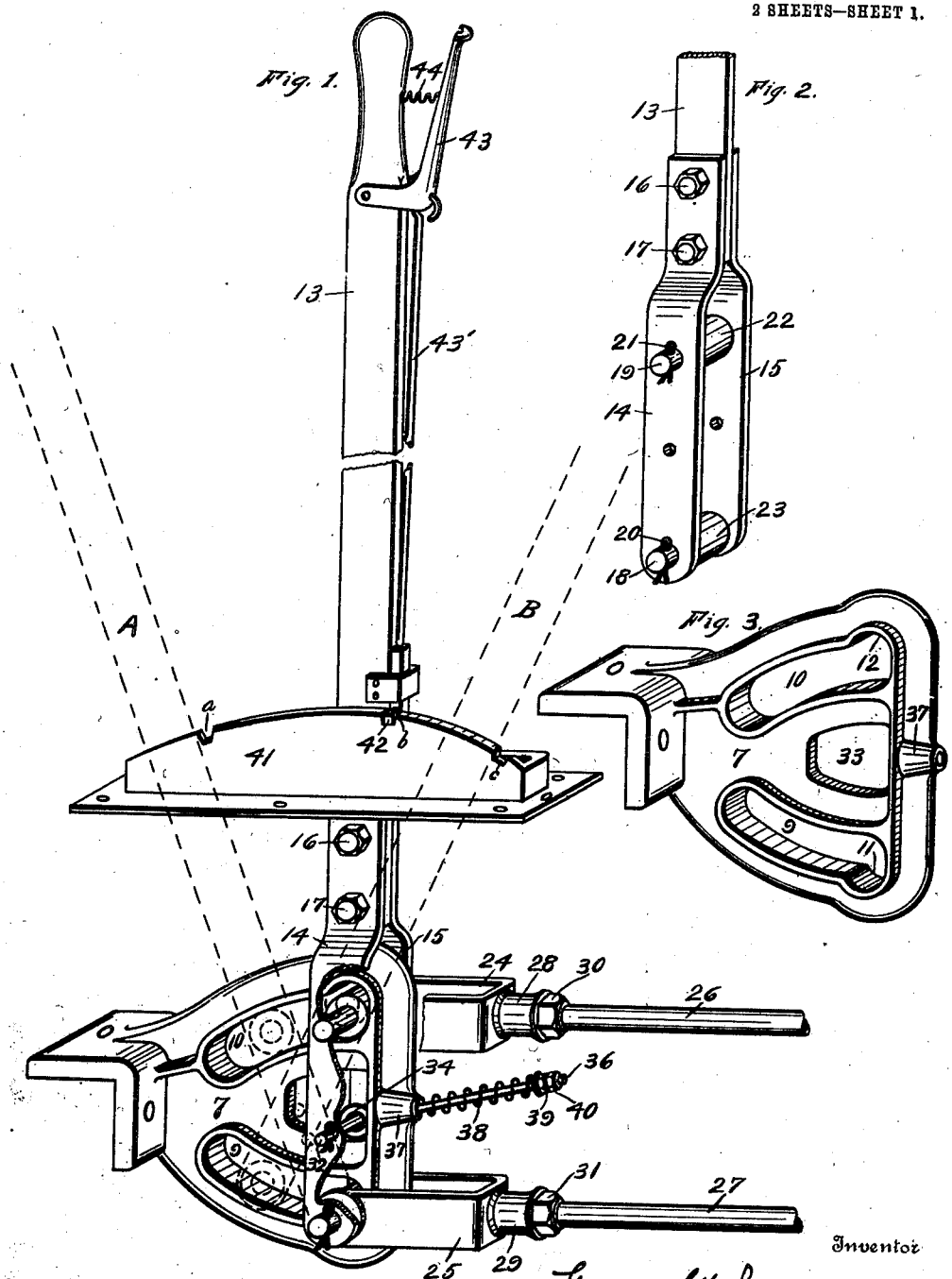

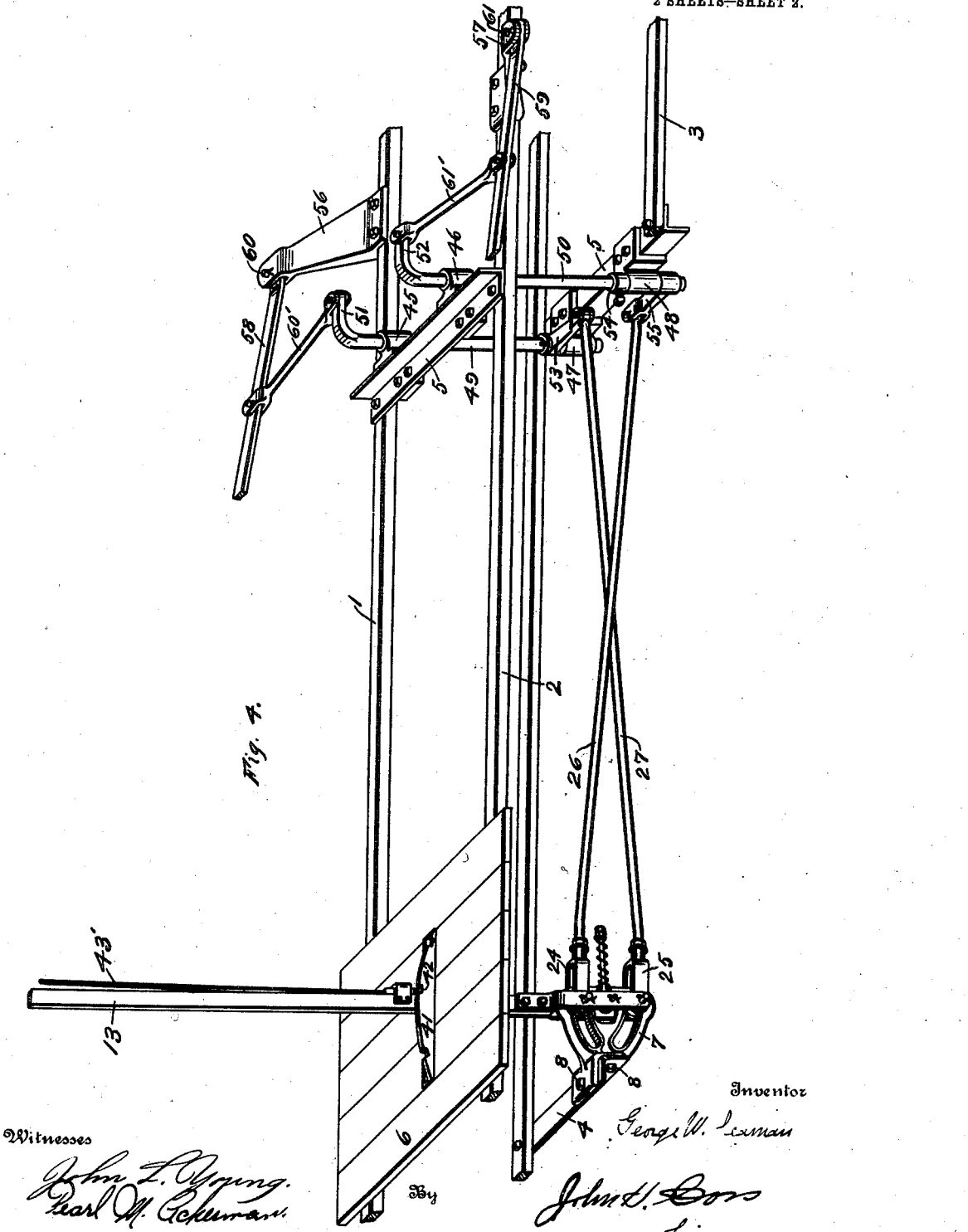

GEORGE W. SEAMAN, OF MANSFIELD, OHIO, ASSIGNOR TO THE AULTMAN & TAYLOR MACHINERY COMPANY, OF MANSFIELD, OHIO, A CORPORATION OF OHIO.

LEVER OPERATING MECHANISM.

1,036,916.   Specification of Letters Patent.   Patented Aug. 27, 1912.

Application filed November 14, 1910. Serial No. 592,406.

*To all whom it may concern:*

Be it known that I, GEORGE W. SEAMAN, a citizen of the United States of America, residing at Mansfield, in the county of Richland and State of Ohio, have invented certain new and useful Improvements in Lever Operating Mechanism, of which the following is a specification.

My invention relates to means for operating friction clutches or the like for traction engines or other road vehicles.

One of the objects of my invention is to provide means of operating two friction clutches through the medium of one operating lever whereby a forward or reverse movement is transmitted by its operation to a traction engine or the like thereby effectually obviating all liability of throwing in action the forward or reverse clutch at the same time as often happens when two levers are used.

Another object is to construct an operating mechanism for friction clutches that is simple and compact and requiring but few parts thereby insuring greater utility and reliability in its operation than can be obtained by the use of two operating levers actuated independent of each other to transmit reverse or forward movement to the tractor or the like.

Another feature of my invention consists in the means of operating and controlling two clutches by one lever independently of the other and by which the lever is maintained in a neutral position and actuated instantly to operate either clutch for forward or reverse movement of the tractor or the like.

These and other objects are accomplished by the mechanism illustrated in the accompanying drawings in which:

Figure 1 is an enlarged side view in perspective of the lever and operating mechanism connected thereto with a part of the bifurcated lower end of the lever partially broken away to show its operation more clearly. Fig. 2 is an elevation in perspective of the lower or bifurcated end of the operating lever. Fig. 3 is an enlarged side view in perspective of the fulcrum bracket showing the shape of the slots and circular depression contiguous thereto that form fulcrums for the rollers of the operating lever. Fig. 4 is a perspective view of the operating lever and its mechanism showing it connected to one form of an auxiliary operating mechanism used to operate friction clutches, both being applied to and mounted upon the frame-work of a gasolene traction engine.

In the drawings, reference-numerals 1, 2 and 3 represent the longitudinal sills of the frame-work, 4 and 5 the angular cross pieces and 6 the floor or platform of the machine. A fulcrum bracket 7 is securely attached to and supported by the angular cross piece 4 by the bolts 8 or in any other well known manner. The bracket 7 is provided with two inclined or radial slots 9 and 10 alined with each other. Circular depressions 11 and 12 are formed contiguous to one end of the slots parallel with each other and provide fulcrums for the lever hereinafter described. The lever 13 has two offset arms 14 and 15 securely fastened to its lower extremity by the bolts 16 and 17 thereby forming a bifurcated or forked end which is adapted to fit over the sides of the bracket and extend across the slots 9 and 10. Shafts 18 and 19 are fitted to suitable apertures provided in the arms of the lever and held in place by cotter pins 20 and 21. Rollers 22 and 23 are mounted upon the shafts. The arms forming the bifurcated end of the lever which extend on each side of the fulcrum bracket are connected thereto by the shafts 18 and 19 which pass through the slots 9 and 10 carrying rollers 22 and 23. Bifurcated members 24 and 25 are pivotally connected to the shafts 18 and 19 and operate within the arms 14 and 15 of the operating lever. Reach rods 26 and 27 are adjustably connected to the bifurcated members 24 and 25 of the threaded interior of the bosses 28 and 29 which engage with the threaded exterior of the ends of the reach rods 26 and 27 and are locked in the adjusted position by the nuts 30 and 31.

In the arms 14 and 15 of the operating lever, apertures are provided about midway between the shafts 18 and 19 and a pin 32 inserted therein and moves within the opening 33 when movement is imparted to the operating lever. An eye bolt 34 engages the pin 32 having its threaded end 36 projecting through an aperture in the boss 37 of the fulcrum bracket 7. A coil spring 38 surrounds the free end of the eye bolt 34 and is held in place under tension by the lock nuts 39 and 40 normally exerting its force and pressure to retain the operating lever in its neutral position. When the operating lever is moved in either direction, the coil spring is compressed and when it is released draws the lever to its neutral position as shown by the full lines in Fig. 1.

In order to hold the operating lever at any position desired, I provide a quadrant 41 which is securely fastened to the floor or platform 6 adjacent to one side of the lever. Three notches $a$, $b$ and $c$ are provided in the edge of the quadrant. A lock 42 and a lever 43 are connected by a rod 43' and attached to the operating lever 13 and arranged so that the lock will aline and register with the notches $a$, $b$ and $c$ as the operating lever is moved to its forward, reverse and neutral positions, the spring 44 automatically forcing the lock to engage the notches. The lock can be withdrawn from the notches by compressing the spring 44 by the pivotal lever 43 and the operating lever is then free to be moved to any point of its throw. The rollers 22 and 23 engage with the circular depressions 11 and 12 and alternately provide a fulcrum for the operating lever. When the operating lever is neutral, the roller 23 is resting upon the circular depression 11. When the operating lever is moved in the direction indicated by reference letter A, the circular depression 11 provides the fulcrum for the lever and the roller 22 is forced to enter and travel in the slot 10 carrying the reach rod 26 in the direction indicated by reference letter A. When the operating lever is moved in the direction indicated by reference letter B, the roller 23 is forced to enter and travel in the slot 9 the circular depression 12 then becoming the fulcrum of the operating lever which carries the reach rod 27 in the direction indicated by reference letter B.

I will now describe the preferred auxiliary mechanism which is used in connection with my operating lever for operating two clutches.

To the angular parts of the frame-work 5—5 bracket bearings 45, 46, 47 and 48 are secured which carry vertical shafts 49 and 50 bent at their upper ends to form cranks as indicated at 51 and 52. The shaft 49 is held in its vertical position by a separable crank 53 which is rigidly keyed to the shaft 49 at right angles to the bent end 51. The crank 53 which is fitted to the shaft 49 rests upon the upper portion of the bracket bearing 47 supporting and retaining the shaft in place. The shaft 50 is supported and retained in place by the collar 54 and a separable crank 55 is rigidly secured to its lower extremity at right angles to the bent upper end 52 of the shaft. The crank 53 has its end bifurcated and is pivotally attached to the end of the reach rod 27. The crank 55 has its end bifurcated and is pivotally attached to the reach rod 26, see Fig. 4. Outwardly extending brackets 56 and 57 are securely fastened to the frame-work and connecting bars 58 and 59 are pivotally connected on one end to said brackets by the pins 60 and 61 and the opposite ends are connected to friction clutches (not shown). The bars 58 and 59 are pivotally connected to the bent crank ends 51 and 52 of the vertical shafts 49 and 50 by the connecting bars 60' and 61' which connect the auxiliary operating mechanism to the operating lever and its operating mechanism.

The operation of my device is as follows: When the operating lever 13 is in the neutral position shown in full lines in Fig. 1, the weight of the lever 13 and its coöperating parts causes the roller 23 to engage and rest in the circular depression 11 contiguous to the slot 9 thus providing a fulcrum for the lever 13 while it is being moved from the neutral position to the position shown by the dotted lines A in Fig. 1, and back to its neutral position. It will be noted that during this operation the shaft 19 carrying the roller 22 will also be moved to the position shown by the dotted lines A, Fig. 1 and with it the bifurcated end 24 and reach rod 26 thereby causing the vertical shaft 50 to partially rotate about its vertical axis through the medium of the lever 55. The crank end 52 being integral with the vertical shaft 50 will partially rotate about the same axis causing it to be drawn inward carrying with it the connecting rod 61' and pivotally connected clutch bar 59 thus operating the auxiliary clutch mechanism for one clutch. In moving the operating lever 13 from the neutral position to the position indicated by the dotted lines B shown in Fig. 1, the roller 23 is forced upward out of the circular depression 11 into the slot 9 causing the roller 22 to engage the circular depression 12 of the slot 10, the roller 22 thus providing a fulcrum for the lever while the shaft 18 carrying the roller 23, bifurcated member 25 and reach rod 27 is being moved from the neutral position to the position shown by the dotted lines B, Fig. 1 and back to the neutral position.

I claim:

1. In a lever operating mechanism, a bracket having a pair of substantially horizontal superposed spaced slots therein one of the ends of each slot being formed with a depression and a vertical lever having an upper and a lower fixed projection which extend into the slots for engagement in said depressions.

2. In a lever operating mechanism, a bracket having a pair of substantially horizontal superposed spaced slots therein one of the ends of each slot being formed with a depression, said bracket being formed with an opening in the space between said slots, a vertical lever having an upper and a lower projection which extend in the pair of slots for engagement in said depressions, a pin carried by the lever and extending in said opening between the pair of slots and a spring connection between said pin and the bracket to normally retain the lever in neutral position.

3. In a lever operating mechanism, a bracket having a pair of substantially horizontal superposed spaced slots therein one of the ends of each slot being formed with a depression, said bracket being formed with an opening in the space between said slots, a vertical lever having an upper and a lower projection which extend in the pair of slots for engagement in said depressions, a pin carried by the lever and extending in said opening between the pair of slots, a rod loosely connected to one end of the pin and having its other end passing through an aperture provided therefor in said bracket, a spring encircling the rod and bearing at one end against the bracket, and means on the other end of the rod to restrict the movement of the spring.

4. In a lever operating mechanism, a bracket having a pair of substantially horizontal superposed spaced slots, a vertical lever having an upper and a lower fixed projection which extend in said slots, and means to positively lock said lever in three positions, one in which the upper projection is at one end of the upper slot, another in which the lower projection is at the same end of the lower slot, and the third in which the lever occupies a vertical neutral position.

5. In a lever operating mechanism, a bracket having a pair of substantially horizontal superposed spaced slots, a vertical lever having an upper and a lower fixed projection which extend in said slots, means at one end of each slot to form a fulcrum for the projections of the lever, and means to positively lock said lever in three positions, one in which the upper projection is at one end of the upper slot, another in which the lower projection is at the same end of the lower slot, and the third in which the lever occupies a vertical neutral position.

In testimony whereof I affix my signature in presence of two witnesses.

GEORGE W. SEAMAN.

Witnesses:
JOHN H. COSS,
PEARL M. ACKERMAN.